Sept. 26, 1950      G. C. PAXTON      2,523,631
CONNECTING ROD UNIT
Filed Feb. 3, 1948

INVENTOR
G.C. Paxton
BY
ATTORNEYS

Patented Sept. 26, 1950

2,523,631

UNITED STATES PATENT OFFICE 2,523,631

CONNECTING ROD UNIT

Gerald C. Paxton, Sanger, Calif., assignor to General Nailing Machine Corporation, Sanger, Calif., a corporation of California Application February 3, 1948, Serial No. 6,096

3 Claims. (Cl. 74—581)

This invention has for an object the provision of a novel connecting rod unit for use between a driving part and a driven part of a machine wherein the driven part may reach its limit of motion before the driving part completes the corresponding stroke; the connecting rod unit being extensible under such conditions to prevent stalling or structural damage of the machine.

In particular, the invention is directed to, and it is an object to provide, a connecting rod unit especially designed for use between the driving crank and the reciprocable top bar of a box nailing machine, wherein said top bar may reach its limit of downward motion before the crank passes bottom dead-center; the connecting rod unit then extending to the necessary extent to permit continued rotation of the crank.

Another object of the invention is to provide a connecting rod unit, as above, which is arranged so that such extension may occur only after the imposition of a predetermined load or tension thereon; such result being attained by forming the rod as a hydraulic cylinder, and controlling its piston motion by a novel check valve assembly interposed in the fluid or hydraulic circuit of said cylinder.

A further object of the invention is to provide a practical and reliable connecting rod unit, and one which will be exceedingly effective for the purpose for which it is designed.

These objects are accomplished by means of such structure and relative arrangement of parts as will fully appear by a perusal of the following specification and claims.

Figure 1:
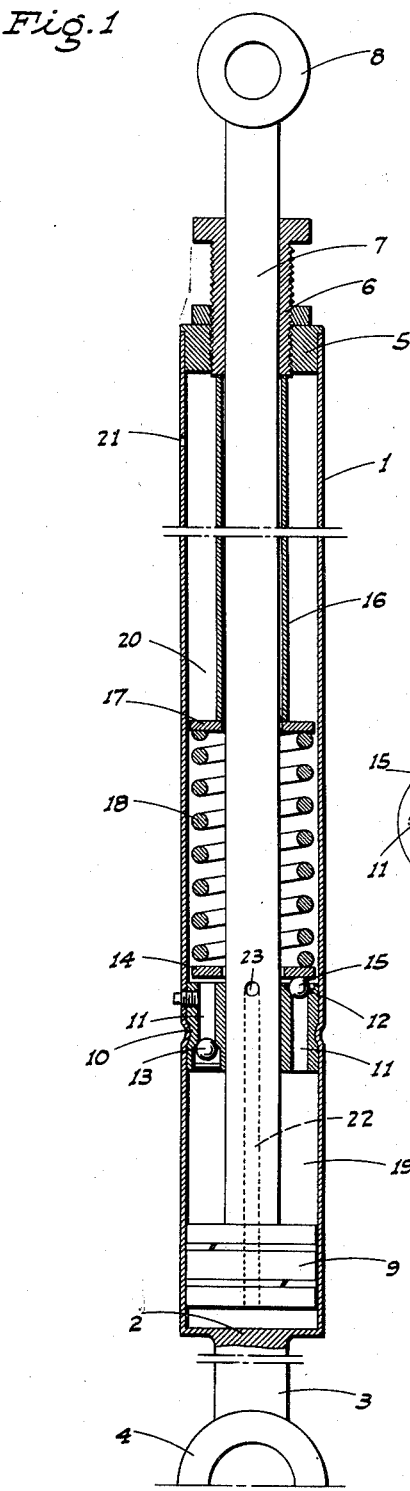
Fig. 1 is a sectional elevation of the connecting rod unit contracted.
Figure 3:
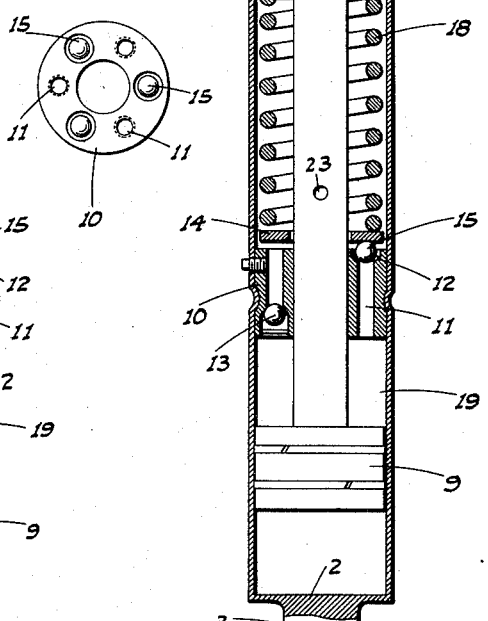
Fig. 3 is a plan view of the annular valve body, detached.

Referring now more particularly to the characters of reference on the drawings, the connecting rod unit is comprised of an elongated, relatively small-diameter cylinder 1 closed at one end, as at 2; such closed end having an axially projecting neck 3 formed with an attachment eye 4. At the opposite end the cylinder 1 is fitted with an end bushing 5 into which a bearing nut 6 is threaded, and a piston rod 7 slidably extends through the bearing nut 6. At its outer end the piston rod 7 includes an attachment eye 8.

When the device is in use the attachment eye 4 is coupled to the driving part, such as a rotary crank, and the attachment eye 8 is coupled to the driven part, such as the reciprocable top bar of a nailing machine.

In co-pending application, Serial No. 751,741, filed June 2, 1947, there is a diagrammatic illustration, at 12, of the connecting rod units as embodied in a nailing machine.

The connecting rod unit includes, within the cylinder 1, a piston 9 on the inner end of the piston rod 7; such piston normally being disposed adjacent the closed end 2 of the cylinder.

Some distance above the normal position of the piston 9 the cylinder 1 is fitted, internally, with an annular, valve body 10, through which the piston rod 7 slidably projects with a close running fit.

The annular, valve body 10 is formed with a plurality of circumferentially spaced passages 11 therethrough parallel to the piston rod and between the latter and the shell of the cylinder. Certain of the passages 11 are provided, at the end opposite the piston 9, with check valves 12 which open away from said piston. The remaining passages 11 are formed with check valves 13 at the end of said passages adjacent the piston 9 with said valves 13 opening toward such piston.

A washer 14 surrounds the piston rod 7 and bears against the balls 15 of the check valves 12, which are of ball-check type.

A spacer sleeve 16 surrounds the piston rod 7 between the bearing nut 6 and a washer 17 which also surrounds said rod in considerably spaced relation to the washer 14. A heavy-duty helical compression spring 18 is engaged between the washers 14 and 17 in surrounding relation to the piston rod 7; such compression spring 18 normally being loaded to a predetermined extent and exerting its pressure on the washers 17 and 14, which in turn normally maintains the check valves 12 closed. The loading of the compression spring 18 is adjustable by means of the bearing nut 6, whose adjustment is transmitted through the spacer sleeve 16 to said spring.

Figure 2:
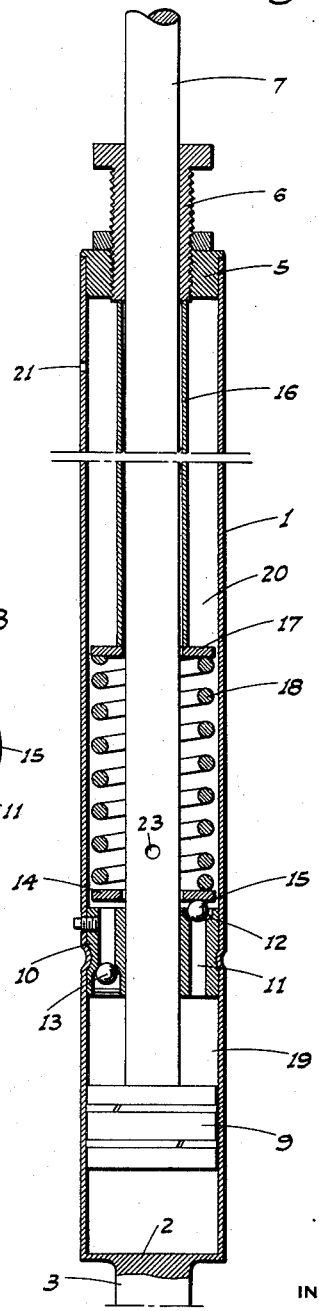
Fig. 2 is a similar view, but shows the connecting rod unit extended as under a predetermined load or tension.

The chamber 19 between the piston 9 and valve body 10 is filled with a hydraulic fluid or oil, as is the chamber 20 on the opposite side of said valve body; the device being intended to work in an upright position, as shown in Figs. 1 and 2. A vent hole 21 is formed in the cylinder adjacent the upper end bushing 5.

When the described connecting rod unit is in use, as in a nailing machine between a rotary crank and a reciprocable top bar, the device initially acts to transmit motion between said parts without any extension of said device; this being for the reason that the spring 18 is set to maintain the check valves 12 closed against predetermined fluid pressure in the chamber 19, and of course the check valves 13 prevent any back flow from chamber 19 to chamber 20.

However, when the driven part, such as the reciprocable top bar of a nailing machine, reaches its downward limit of motion before the driving part, such as the crank, reaches bottom dead-center of its stroke, the tension on the device is increased beyond normal. When this occurs, the excess tension is reflected as increased fluid pressure in chamber 19, which causes check valves 12 to open against the compression of spring 18, permitting the piston 9 to move upwardly to a certain extent in the cylinder. The result is extension of the device, which permits the driving part, such as a crank, to continue rotation beyond bottom dead-center. In this manner stalling of the machine or damage to structural parts is prevented.

After excess tension on the device is relieved, the parts return to normal, with the piston 9 traveling back toward the closed end 2, sucking a return supply of fluid from the chamber 20, through the check valves 13, into the chamber 19.

It will be recognized that the relief or release point of the device may be adjusted by the simple manipulation of the bearing nut 6 to impose a greater or lesser load on the compression spring 18.

To assure against any restriction of motion of the piston 9 by reason of compression or fluid accumulated between said piston and the closed end 2 of the cylinder, there is a bleed passage 22 in the piston rod 7 leading upward from its lower end to a lateral port 23 which depends above said piston.

Not only does the described check valved, hydraulic system provide for cushioned extension and contraction of the device, but also the check valve arrangement is such that the pressure required to open the check valves 12 is not increased with continued motion of the piston 9 in the cylinder. In other words, piston motion, other than causing initial opening of said valves 12 against the spring, does not continue to further load said spring.

From the foregoing description it will be readily seen that there has been produced such a device as will substantially fulfill the objects of the invention as set forth herein.

While this specification sets forth herein the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired:

1. A connecting rod unit comprising a cylinder having a piston rod slidably projecting thereinto from the end, connection elements on the free ends of the cylinder and piston rod, a piston on the rod in the cylinder, an annular valve body in the cylinder in spaced relation to the piston in the direction of its travel upon extension of the unit, the piston rod sliding through said body, one check valve associated with the body opening away from the piston, another check valve associated with the body opening toward the piston, a quantity of fluid in the cylinder between the piston and body, and spring means normally resisting opening of said one check valve but permitting opening thereof under predetermined excess pressure in the chamber; such spring means including a loaded helical compression spring surrounding the piston rod beyond the end of the valve body opposite the piston, said one valve including a control element exposed to and engaged by the spring.

2. A connecting rod unit comprising a cylinder having a piston rod slidably projecting thereinto from one end, connection elements on the free ends of the cylinder and piston rod, a piston on the rod in the cylinder, an annular valve body in the cylinder in spaced relation to the piston in the direction of its travel upon extension of the unit, the piston rod sliding through said body, one check valve associated with the body opening away from the piston, another check valve associated with the body opening toward the piston, a quantity of fluid in the cylinder between the piston and body, and spring means normally resisting opening of said one check valve but permitting thereof under predetermined excess pressure in the chamber; such spring means including a loaded helical compression spring surrounding the piston rod beyond the end of the valve body opposite the piston, said one valve including a control element exposed to and engaged by the spring, an adjustment nut in said one end of the cylinder, and a spacer sleeve about the rod between the adjustment nut and the spring.

3. A connecting rod unit comprising a cylinder having a piston rod slidably projecting thereinto from one end, connection elements on the free ends of the cylinder and piston rod, a piston on the rod in the cylinder, an annular valve body in the cylinder in spaced relation to the piston in the direction of its travel upon extension of the unit, the piston rod sliding through said body, one check valve associated with the body opening away from the piston, another check valve associated with the body opening toward the piston, said one check valve having a control element exposed at the end of the valve body opposite the piston, a washer surrounding the rod and bearing against said control element, a helical compression spring surrounding the rod and seating on said washer, an adjustment nut threaded in said one end of the cylinder, a spacer sleeve about the rod between the adjustment nut and said spring, the latter being loaded, and a quantity of fluid in the cylinder beyond opposite ends of the valve body.

GERALD C. PAXTON.

REFERENCES CITED

The following references are of record in the file of this patent:

UNITED STATES PATENTS

| Number | Name | Date |
|---|---|---|
| 1,886,712 | Messier | Nov. 8, 1932 |
| 2,038,032 | Flynn | Apr. 21, 1936 |
| 2,360,755 | Boor | Oct. 17, 1944 |
| 2,403,648 | Focht | July 9, 1946 |